(12) United States Patent
Liang

(10) Patent No.: US 11,893,246 B2
(45) Date of Patent: Feb. 6, 2024

(54) METHOD FOR CALCULATING INDEX OF STRIPE WHERE STRIP IS LOCATED FOR DISK, TERMINAL AND STORAGE MEDIUM

(71) Applicant: INSPUR SUZHOU INTELLIGENT TECHNOLOGY CO., LTD., Jiangsu (CN)

(72) Inventor: Xinling Liang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/027,502

(22) PCT Filed: Sep. 30, 2021

(86) PCT No.: PCT/CN2021/122290
§ 371 (c)(1),
(2) Date: Mar. 21, 2023

(87) PCT Pub. No.: WO2022/100322
PCT Pub. Date: May 19, 2022

(65) Prior Publication Data
US 2023/0289068 A1  Sep. 14, 2023

(30) Foreign Application Priority Data
Nov. 13, 2020 (CN) .......................... 202011266047.4

(51) Int. Cl.
*G06F 3/06* (2006.01)
*G06F 3/00* (2006.01)
*G06F 11/10* (2006.01)

(52) U.S. Cl.
CPC ............ *G06F 3/0619* (2013.01); *G06F 3/064* (2013.01); *G06F 3/0689* (2013.01); *G06F 11/1076* (2013.01); *G06F 2211/1002* (2013.01)

(58) Field of Classification Search
CPC ...... G06F 3/0619; G06F 3/064; G06F 3/0689; G06F 11/1076; G06F 2211/1002; H03M 13/00
See application file for complete search history.

(56) References Cited

U.S. PATENT DOCUMENTS 7,418,621 B2 *  8/2008  Ashmore ............ G06F 11/1076
  714/42
7,519,629 B2 *  4/2009  Hafner ................ G06F 11/1076
  714/6.24

(Continued)

FOREIGN PATENT DOCUMENTS

CN  101387975 A  3/2009
CN  101504623 A  8/2009

(Continued)

OTHER PUBLICATIONS

PCT/CN2021/122290 international search report.

*Primary Examiner* — Justin R Knapp
(74) *Attorney, Agent, or Firm* — IPro, PLLC

(57) ABSTRACT

The present application provides a method and a system for calculating a stripe of a strip for a disk, a terminal and a storage medium. The method includes: calculating a pack offset of a parity block according to a given disk index; calculating an address of a strip where the parity block is located in the disk according to the pack offset; comparing an address of a to-be-checked strip with the address of the strip where the parity block is located in the disk to determine whether the parity block is on the to-be-checked strip; and calculating a stripe index of the to-be-checked strip by considering redundant elements caused by the parity block in response to determining that the parity block is on the to-be-checked strip; or calculating the stripe index of the (Continued)

to-be-checked strip directly in response to determining that the parity block is not on the to-be-checked strip.

20 Claims, 2 Drawing Sheets

(56) References Cited

U.S. PATENT DOCUMENTS

| | | | | |
|---|---|---|---|---|
| 7,870,464 | B2* | 1/2011 | Hafner | G06F 11/1076 |
| | | | | 714/758 |
| 10,209,904 | B2* | 2/2019 | Himelstein | G06F 11/0709 |
| 2019/0317889 | A1* | 10/2019 | Chang | G06F 3/064 |

FOREIGN PATENT DOCUMENTS

| | | |
|---|---|---|
| CN | 112463036 A | 3/2021 |
| JP | 2005044213 A | 2/2005 |

* cited by examiner

METHOD FOR CALCULATING INDEX OF STRIPE WHERE STRIP IS LOCATED FOR DISK, TERMINAL AND STORAGE MEDIUM

CROSS-REFERENCE TO RELATED APPLICATION

The present disclosure claims the benefit of priority to Chinese patent application No. 202011266047.4 filed on Nov. 13, 2020 before the CNIPA, China National Intellectual Property Administration, and titled "METHOD AND SYSTEM FOR CALCULATING STRIPE OF STRIP FOR DISK, TERMINAL, AND STORAGE MEDIUM", which is incorporated herein by reference in its entirety.

TECHNICAL FIELD

The present application relates to the technical field of storage computing and, in particular to a method and a system for calculating a stripe of a strip for a disk, a terminal, and a storage medium.

BACKGROUND

In contemporary society, the security of important information of users needs to be ensured in banks and hospitals and the like, which is closely related to storage technology. With the development of science and technology, storage technology also has a rapid development. As an important storage technology, RAID has mainly experienced several generations, that is, RAID0, RAID1, RAID10, RAID5, and RAID6.

SUMMARY

In a first aspect, in some embodiments, the present application provides a method for calculating a stripe of a strip for a disk, including:
 calculating a pack offset of a parity block according to a given disk index;
 calculating an address of a strip where the parity block is located in the disk according to the pack offset;
 comparing an address of a to-be-checked strip with the address of the strip where the parity block is located in the disk to determine whether the parity block is on the to-be-checked strip; and
 calculating a stripe index of the to-be-checked strip by considering redundant elements caused by the parity block in response to determining that the parity block is on the to-be-checked strip; or
 calculating the stripe index of the to-be-checked strip directly in response to determining that the parity block is not on the to-be-checked strip.

In some embodiments, the calculating a pack offset of a parity block according to a given disk index includes:
 calculating a position of the parity block in a pack containing the same according to the given disk index and a number of disks; and
 obtaining the pack offset of the parity block by calculating a product of the position of the parity block in the pack containing the same and a strip size.

In some embodiments, the position of the parity block in the pack containing the same=[the number of disks−(the disk index+1)]/2.

In some embodiments, the calculating an address of a strip where the parity block is located in the disk according to the pack offset includes:
 acquiring a pack index and a sector length of each pack; and
 obtaining the address of the strip where the parity block is located in the disk according to the pack index, the sector length of each pack, and the pack offset.

In some embodiments, the address of the strip where the parity block is located in the disk=the pack index*the sector length of each pack+the pack offset.

In some embodiments, the comparing an address of a to-be-checked strip with the address of the strip where the parity block is located in the disk to determine whether the parity block is on the to-be-checked strip includes:
 determining that the parity block is not on the to-be-checked strip in response to determining that the address of the to-be-checked strip is smaller than the address of the strip where the parity block is located in the disk; or determining that the parity block is on the to-be-checked strip in response to determining that the address of the to-be-checked strip is not smaller than the address of the strip where the parity block is located in the disk.

In some embodiments, the calculating a stripe index of the to-be-checked strip by considering redundant elements caused by the parity block includes:
 calculating the stripe index of the to-be-checked strip according to the address of the to-be-checked strip, the sector length of each pack, a number of stripes in each pack, and a sector length occupied by the to-be-checked strip.

In some embodiments, a formula for calculating a stripe index of the to-be-checked strip by considering redundant elements caused by the parity block is: the stripe index of the to-be-checked strip=(the address of the to-be-checked strip/the sector length of each pack)*the number of stripes in each pack+(the address of the to-be-checked strip % the sector length of each pack)/the sector length occupied by the to-be-checked strip.

In some embodiments, the calculating the stripe index of the to-be-checked strip directly includes: calculating the stripe index of the to-be-checked strip according to the address of the to-be-checked strip, the sector length of each pack, the number of stripes in each pack, the sector length occupied by each element in the to-be-checked strip, and the sector length occupied by the to-be-checked strip.

In some embodiments, a formula for calculating the stripe index of the to-be-checked strip directly is: the stripe index of the to-be-checked strip=(the address of the to-be-checked strip/the sector length of each pack)*the number of stripes in each pack+(the address of the to-be-checked strip % the sector length of each pack−the sector length occupied by each element in the to-be-checked strip)/the sector length occupied by the to-be-checked strip.

In a second aspect, in some embodiments, the present application provides a system for calculating strips and stripes for a disk, including:
 an offset calculation unit, configured to calculate a pack offset of a parity block according to a given disk index;
 a strip address calculation unit, configured to calculate an address of a strip where the parity block is located in the disk according to the pack offset; and
 a stripe calculation unit, configured to compare an address of a to-be-checked strip with the address of the strip where the parity block is located in the disk to determine whether the parity block is on the to-be-checked strip; calculate a stripe index of the to-be-checked strip by considering redundant elements caused by the parity block in response to determining that the parity block is on the to-be-checked strip; or calculate the stripe index of the to-be-checked strip directly in response to determining that the parity block is not on the to-be-checked strip.

In a third aspect, in some embodiments, the present application provides a terminal, including a memory and one or more processors, computer-readable instructions are stored in the memory, and the computer-readable instructions, when executed by the processor, cause the one or more processors to perform the method of the embodiments described above.

In a fourth aspect, in some embodiments, the present application provides a computer-readable storage medium storing computer-readable instructions, the computer-readable instructions, when executed by one or more processors, cause the one or more processors to perform the method of the embodiments described above.

BRIEF DESCRIPTION OF THE DRAWINGS

To illustrate the technical solution in the embodiments of the present application or the related art more clearly, the following will briefly introduce the drawings that need to be used in the description of the embodiments or the related art. Apparently, those skilled in the art may arrive at other drawings from these drawings without creative efforts.

DETAILED DESCRIPTION OF THE EMBODIMENTS

Figure 1:
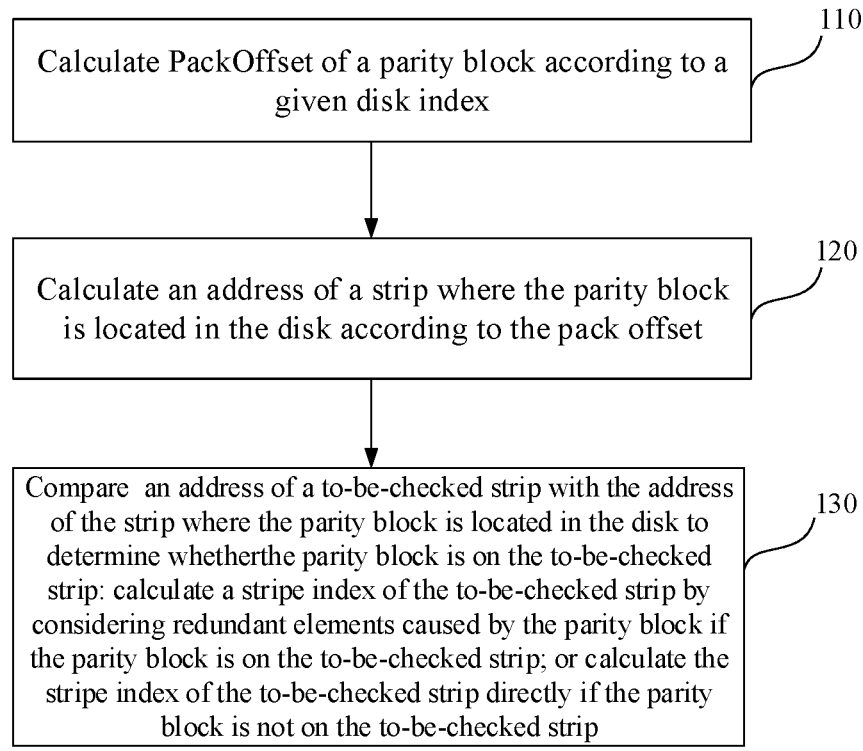
FIG. 1 is a schematic flowchart of a method provided in some embodiments of the present application.

In order that those skilled in the art may better understand the technical solution in the present application, the technical solution in the embodiments of the present application will be clearly and completely described below in conjunction with the drawings in the embodiments of the present application. Apparently, the described embodiments are only some of the embodiments of the present application, but not all of them. Based on the embodiments in this application, all other embodiments obtained by those skilled in the art without creative efforts shall fall within the scope of this application.

Key terms in this application are defined below.
RAID: Redundant Array of Independent Disks, i.e., a redundant array composed of independent disks;
Sector: the smallest division unit of the disk;
Strip;
StripSize: a size of a strip (KB);
Striplength: a number of sectors occupied by a strip;
Striplba: a strip head address;
StripLastLBA: a strip end address;
Pack: a group of disk arrays may be horizontally divided into several packs with same width, named pack0, pack1, pack2, etc.; each pack is composed of several disks. That is, the number of sectors occupied by a disk in the pack is the same for each disk, the sector length of a pack is the same for each pack;
Stripe;
ElementPerStrip: a number of Elements in a strip;
ElementLength=Striplength/ElemenetPerStrip, that is, a number of sectors occupied by each element in a strip;
PackOffset: an offset in a pack;
ComponentCount: a number of disks in an array;
StridePerPack: a number of stripes in each pack;
PackComponentLength: a number of sectors occupied by a pack in a disk (including parity block Q);
ComponentIndex: disk index;
Q_index: a position of the parity block Q in a pack (indicating rows 0, 1, 2, . . . in the pack);
ComponentLBA: an address of a strip in a disk (calculated in the form of sectors);
AverageLength=PackComponentLength/StridesPerPack, that is, an average sector length of stripes in a pack;
PackLbaOffset: an offset of a sector in a pack;

In RAID0, data storage tasks are performed concurrently, and the storage speed is doubled, but the data cannot be reconstructed once it is lost; in RAID1, this problem is completely avoided because the data is backed up in a mirror disk while being stored to ensure data security, but the disadvantage is that the speed of storage slows down; RAID10 is a storage technology between RAID0 and RAID1, but reconstruction of data is only possible when the lost data is in one of the mirror disks, otherwise the data cannot be reconstructed; in RAID5, parity blocks P are added to a disk array, so that, if any disk in the disk array is lost, the data in the disk may be calculated based on the parity blocks P; in RAID6, parity blocks Q are further added to the disk array, so that, if any two disks in the disk array are lost, the data of the lost disks may be calculated based on the parity blocks P and Q.

In RAID6, each strip in the data blocks and the parity blocks P has 16 elements, while in the parity blocks Q, each strip has 17 elements, which is one more sector longer than the other strips. It is known that the sector length of a disk in each pack is fixed. In a RAID6 spatial distribution, given a strip address of the strip in the disk, the problem we often need to solve is to calculate the stripe where the strip is located. The conventional method is cumbersome because it is necessary to make a guess of a closest stripe first and then verify whether the guess is correct. Given the strip address in the disk, the pack index of the pack where the strip is located (or a total number of packs above the pack where the strip is located) is equal to the strip address/sector length. The total number of stripes in the packs above the pack where the strip is located may be derived by calculating a product of the number of packs and the number of stripes in each pack. To calculate the stripe index of a stripe where the strip is located, it is also necessary to calculate the number of stripes above the strip in the pack. However, there is one parity block Q in each pack, with a strip length longer than that of other strips, which increases the complexity of the calculation. The conventional method is to make a guess and then verify and adjust, as follows:

first, a guess is performed:
the sector offset=the strip address % the sector length of each pack, through which the offset of the strip address in a pack is calculated; a guessed stripe index=the sector offset/the strip length+(the strip address/the sector length of each pack)*the number of stripes in each pack;

second, verification and adjustment is performed:
according to the stripe derived in the first step, the strip head and end address of the stripe are calculated;
a strip head address=(the stripe index/the number of stripes in each pack*the sector length of each pack+a pack offset*the strip length (the pack offset=the stripe index % the number of stripes in each pack, and in this row, whether the parity block Q causes multiple elements is not considered)+a calculation result as to whether there is an offset element caused by the parity block Q; given the disk index, a position of the parity block Q in the pack is derived; if the pack offset is below the parity block Q, the function returns the offset of an element, otherwise the function returns 0); herein, the strip length is the sector length occupied by the strip.

a strip end address=the strip head address+the strip length−1;

if the strip address<the strip head address, it proves that the guessed stripe index is too large, and the stripe index is subjected to a "−−" operation;

if the strip address<the strip end address, it proves that the guessed stripe index is too small, and the stripe index is subjected to a "++" operation.

It may be seen that the above method of finding the stripe where the strip is located is very cumbersome.

FIG. 1 is a schematic flowchart of a method according to an embodiment of the present application. Herein, the method in FIG. 1 may be implemented by a system for calculating a stripe of a strip for a disk, and the system may run on one or more terminals.

As shown in FIG. 1, the method includes steps described below.

At step 110, a pack offset of a parity block is calculated according to a given disk index.

At step 120, an address of a strip where the parity block is located in the disk is calculated according to the pack offset.

At step 130, whether the parity block is on a to-be-checked strip is determined by comparing an address of a to-be-checked with the address of the strip where the parity block is located in the disk.

If the parity block is on the to-be-checked strip, a stripe index of the to-be-checked strip is calculated by considering redundant elements caused by the parity block.

If the parity block is not on the to-be-checked strip, the stripe index of the to-be-checked strip is calculated directly.

In some implementations, the pack offset of the parity block is calculated according to the given disk index as follows:

calculating, by a terminal, a position of the parity block in a pack containing the same based on the given disk index and a number of disks according to the following formula: the position of the parity block in the pack containing the same=[the number of disks−(the disk index+1)]/2; and calculating a product of the position of the parity block in the pack containing the same and a strip size to obtain the pack offset of the parity block.

In some implementations, the address of the strip where the parity block is located in the disk is calculated according to the pack offset as follows:

acquiring a pack index and a sector length of each pack;
the address of the strip where the parity block is located in the disk=the pack index*the sector length of each pack+the pack offset.

In some implementations, whether the parity block is on a to-be-checked strip is determined by comparing an address of a to-be-checked with the address of the strip where the parity block is located in the disk as follows:

determining that the parity block is not on the to-be-checked strip if the address of the to-be-checked strip is smaller than the address of the strip where the parity block is located in the disk; otherwise, determining that the parity block is on the to-be-checked strip.

In some implementations, a formula for calculating the stripe index of the to-be-checked strip by considering redundant elements caused by the parity block is: the stripe index of the to-be-checked strip=(the address of the to-be-checked strip/the sector length of each pack)*the number of stripes in each pack+(the address of the to-be-checked strip % the sector length of each pack)/the sector length occupied by the to-be-checked strip.

In some embodiments, a formula for directly calculating the stripe index of the to-be-checked strip is: the stripe index=(the address of the to-be-checked strip/the sector length of each pack)*the number of stripes in each pack+(the address of the to-be-checked strip % the sector length of each pack−the sector length occupied by each element in the to-be-checked strip)/the sector length occupied by the to-be-checked strip.

Herein, % is a remainder calculator, the address of the to-be-checked strip is the sector length from the to-be-checked strip to a starting position of the disk, the address of the to-be-checked strip % the sector length of each pack refers to an offset of a point to which the address is directed in a pack containing the same; since the sector length is the same for each pack, the sector length of the pack containing the same is equal to the sector length of each pack; since the sector length occupied by each strip is also the same for each strip, the sector length occupied by the to-be-checked strip is equal to the sector length occupied by each strip (also referred to as the sector length of the strip). Therefore, according to the above formulae, a stripe relationship of the to-be-checked strip in the pack may be derived.

To facilitate the understanding of the present application, the method provided by the present application will be further described below by illustrating the principle of the method for calculating strips and stripes in a disk disclosed in the present application, in conjunction with the process of managing the RAID6 spatial distribution in the embodiment.

Specifically, as disclosed, the method for calculating strips and stripes in a disk includes the following steps.

1. In this embodiment, the disk index is first given, then the PackOffset of the parity block Q in each pack is uniquely determined according to the following formula:

$$Q\_Index=[ComponentCount-(ComponentIndex+1)]/2;$$

$$Q\_Index+=[\{ComponentCount-(ComponentIndex+1)\}\%\ 2]*[(ComponentCount+1)/2];$$

where Q_index refers to the position of the parity block Q in the pack, that is, rows 0, 1, 2, . . . in the pack;

2. An offset of the parity block Q in the pack, that is, PackOffset, is derived according to the following formula: PackOffset=Q_index*Strip_size;

3. Further, the address of the strip where the parity block Q is located in the disk, that is, QComponentlba, is derived according to the following formula:

$$QComponentlba=Pack*PackComponentLength+PackOffset.$$

4. (1) If an incoming strip address Componentlba is smaller than QComponentlba, it means that there is no parity block Q in the strip in the pack, and a stride index is derived as follows: stride=(componentlba/PackComponentLength)*stridePerPack+(componentlba % PackComponentLength)/stripLength;

(2) If the incoming strip address Componentlba is larger than QComponentlba, it means that there is a parity block in the strip in the pack, and the stride index is derived as follows stride=(componentlba/PackComponentLength)*stridePerPack+(componentlba % PackComponentLength−ElementLength)/stripLength.

Different from the related art, the method for calculating strips and stripes in a disk disclosed in some embodiments of the present application has the following effects: the algorithm for solving the strip head address in RAID6 is improved, and an algorithm that makes it easier to understand and simple to calculate the strip head address in the pack is provided; the existing method of first making a guess and then verifying is replaced by the comparison method, so as to increases the calculation speed, thereby speeding up the operation of reading and writing in storage.

Figure 2:
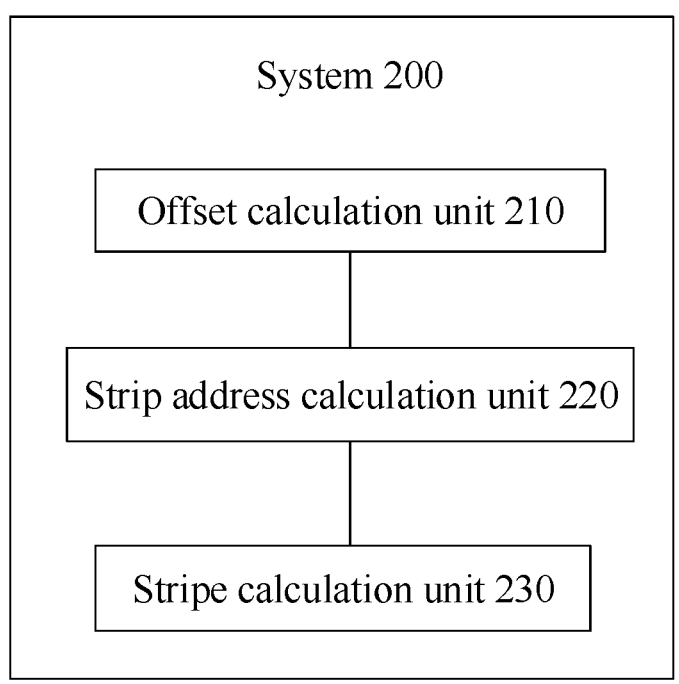
FIG. 2 is a schematic block diagram illustrating a system according to some embodiments of the present application.

As shown in FIG. 2, the system 200 includes:

an offset calculation unit 210, configured to calculate a pack offset of a parity block according to a given disk index;

a strip address calculation unit 220, configured to calculate an address of a strip where the parity block is located in the disk according to the pack offset; and a stripe calculation unit 230, configured to compare an address of a to-be-checked strip with the address of the strip where the parity block is located in the disk to determine whether the parity block in in the to-be-checked strip. If it is determined that the parity block is in the to-be-checked strip, a stripe index of the to-be-checked strip is calculated by considering redundant elements caused by the parity block on the basis of the determination; or, if the parity block is not in the to-be-checked strip, the stripe index of the to-be-checked strip is calculated directly on the basis of the determination.

According to the system for calculating strips and stripes in a disk disclosed in some embodiments, the algorithm for solving the strip head address in RAID6 is improved, and an algorithm that makes it easier to understand and simple to calculate the strip head address in the pack is provided; the existing method of first making a guess and then verifying is replaced by the comparison method, so as to increases the calculation speed, thereby speeding up the operation of reading and writing in storage.

Each module described in the above-mentioned method and device may be implemented in whole or in part by software, hardware or a combination thereof. The above-mentioned modules may be embedded in or independent of a processor in a server in the form of hardware, or may be stored in a memory of the server in the form of software, so that the processor may invoke and execute the corresponding operations of the above-mentioned modules.

The terms "component", "module" and "system" and the like as used in this application are intended to refer to a computer-related entity, which may be hardware, a combination of hardware and software, software, or software in execution. For example, a component may be, but is not limited to, a process running on a processor, a processor, an object, an executable code, a thread of execution, a program, and/or a computer. As an illustration, both an application running on a server and a server may be a component. One or more components may reside within a process and/or thread of execution, and a component may be localized on one computer and/or distributed between two or more computers.

Figure 3:
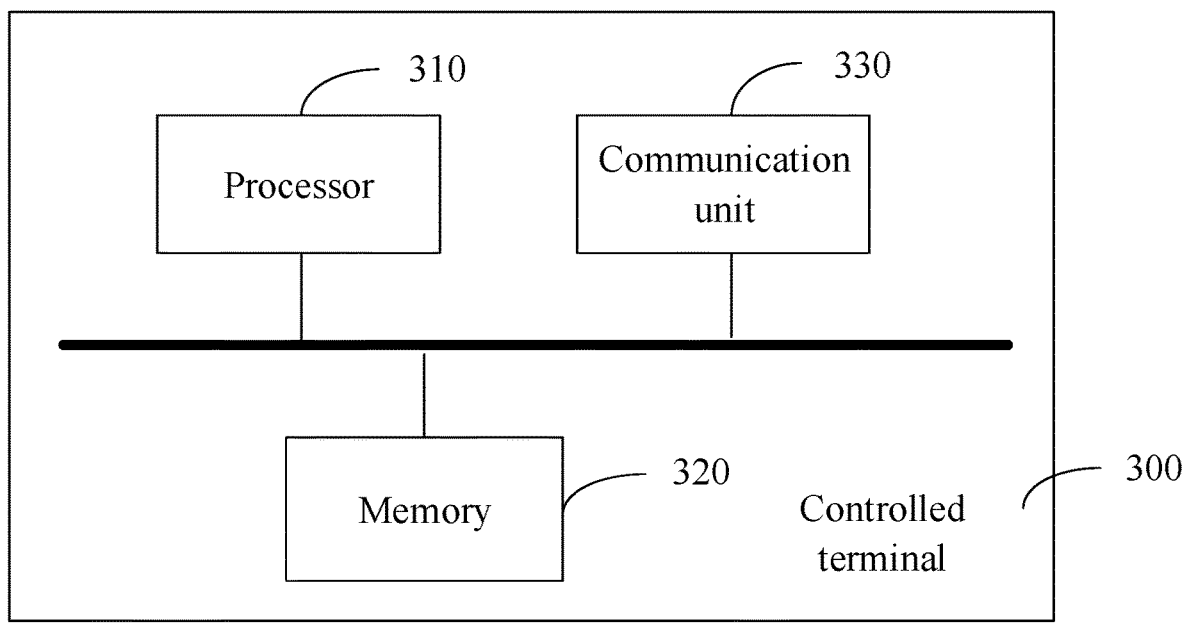
FIG. 3 is a schematic structural diagram of a terminal provided by some embodiments of the present application.

FIG. 3 is a schematic block diagram illustrating a terminal system 300 provided by an embodiment of the present application, and the terminal system 300 may be used to implement the method for calculating strips and stripes in a disk provided by the above-mentioned embodiment of the present application.

Herein, the terminal system 300 may include: a processor 310, a memory 320, and a communication unit 330. These components communicate through one or more buses. Those skilled in the art may understand that the structure of the server shown in the drawings does not limit the present application, may be a bus structure or a star structure, and may have more or fewer components than shown, combinations of certain components, or different arrangements of components.

Herein, the memory 320 may be used to store the execution instructions of the processor 310, and the memory 320 may be realized by any type of volatile or non-volatile storage terminals or their combination, such as Static Random Access Memory (SRAM), Electronic Erasable Programmable Read Only Memory (EEPROM), Erasable Programmable Read Only Memory (EPROM), Programmable Read Only Memory (PROM), Read Only Memory (ROM), magnetic memory, flash memory, magnetic disks, or optical disks. When the execution instructions in the memory 320 are executed by the processor 310, the terminal 300 is enabled to perform some or all of the steps in the above-mentioned method embodiments.

The processor 310 is a control center of the storage terminal, using various interfaces and lines to connect various parts of the entire electronic terminal; by running or executing computer-readable instructions and/or modules stored in the memory 320, and calling the data stored in the memory, the processor 310 performs various functions of the electronic terminal and/or processes data. The processor may be composed of an integrated circuit (IC), for example, composed of a single packed IC, or composed by connecting multiple packed ICs with the same function or different functions. For example, the processor 310 may only include a central processing unit (CPU). In the embodiments of the present application, the CPU may include a single computing core or multiple computing cores.

The communication unit 330 is configured to establish a communication channel, so that the storage terminal may communicate with other terminals, receive user data sent by other terminals, or send user data to other terminals.

The present application further provides a computer storage medium storing computer-readable instructions, and when the computer-readable instructions are executed, some or all of the steps in the embodiments provided in the present application may be included. The storage medium may be a magnetic disk, an optical disk, a read-only memory (ROM), or a random-access memory (RAM), and the like.

Those skilled in the art may clearly understand that the technologies in the embodiments of the present application may be implemented by means of software plus a necessary general-purpose hardware platform. Based on such an understanding, the technical solution in the embodiment of the present application is essentially or the part that contributes to the prior art may be embodied in the form of a software product, and the computer software product is stored in a storage medium such as a USB flash drive, mobile hard disk, read-only memory (ROM), random-access memory (RAM), magnetic disk, or optical disk and other media that may store program codes, including several instructions to cause a computer terminal (may be a personal computer, a server, or a second terminal, a network terminal, etc.) to execute all or part of the steps of the method described in the various embodiments of the present application.

Reference may be made for the same and similar parts among the various embodiments in this specification. In particular, for the terminal embodiment, it is basically similar to the method embodiment, the description is relatively simple, reference may be made to the description in the method embodiment for relevant details.

In some embodiments provided in the present disclosure, it should be understood that the proposed system and method may be implemented in other ways. For example, the system embodiments described above are merely illustrative. For example, the division of the units is only a logical function division, and there may be other divisions in actual implementation, for example, multiple units or components may be combined or can be integrated into another system, or some features can be ignored or not implemented. In addition, the displayed or discussed mutual coupling or direct coupling or communication connection may be indirect coupling or communication connection through some interfaces, the indirect coupling or communication connection between systems or units may be in electrical, mechanical or other forms.

The units described as separated components may or may not be physically separated, and the components displayed as units may or may not be physical units, that is, they may be located at one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or the units are separated physically, or two or more units may be integrated into one unit.

Although the present application has been described in detail in conjunction with preferred embodiments with reference to the accompanying drawings, the present application is not limited thereto. Those skilled in the art can make various equivalent modifications or replacements to the embodiments of the application without departing from the spirit and essence of the application, and these modifications or replacements should be within the scope of the application/any changes or substitutions those skilled in the art can easily think of within the technical scope disclosed in this application should be covered within the protection scope of this application. Therefore, the protection scope of the present application should be based on the protection scope of the attached claims.

The invention claimed is:

1. A method for calculating an index of a stripe where a strip is located for a disk, applied to RAID6 for obtaining strip head address in a pack to speed up reading and writing in the RAID6, the method comprising:
calculating a pack offset of a parity block according to a given disk index;
calculating an address of a strip where the parity block is located in the disk according to the pack offset;
comparing an address of a to-be-checked strip with the address of the strip where the parity block is located in the disk to determine whether the parity block is on the to-be-checked strip; and
calculating an index of a stripe where the to-be-checked strip is located by considering additional elements of the parity block relative to the to-be-checked strip in response to determining that the parity block is on the to-be-checked strip; or
calculating the index of the stripe where the to-be-checked strip is located directly in response to determining that the parity block is not on the to-be-checked strip.

2. The method according to claim 1, wherein the calculating a pack offset of a parity block according to a given disk index comprises:
calculating a position of the parity block in a pack containing the parity block according to the given disk index and a number of disks; and
obtaining the pack offset of the parity block by calculating a product of the position of the parity block in the pack containing the parity block and a strip size.

3. The method according to claim 2, wherein the position of the parity block in the pack containing the parity block= [the number of disks−(the disk index+1)]/2.

4. The method according to claim 1, wherein the calculating an address of a strip where the parity block is located in the disk according to the pack offset comprises:
acquiring a pack index and a sector length of each pack; and
obtaining the address of the strip where the parity block is located in the disk according to the pack index, the sector length of each pack, and the pack offset.

5. The method according to claim 4, wherein the address of the strip where the parity block is located in the disk=(the pack index*the sector length of each pack)+the pack offset.

6. The method according to claim 1, wherein the comparing an address of a to-be-checked strip with the address of the strip where the parity block is located in the disk to determine whether the parity block is on the to-be-checked strip comprises:
determining that the parity block is not on the to-be-checked strip in response to determining that the address of the to-be-checked strip is smaller than the address of the strip where the parity block is located in the disk; or determining that the parity block is on the to-be-checked strip in response to determining that the address of the to-be-checked strip is not smaller than the address of the strip where the parity block is located in the disk.

7. The method according to claim 1, wherein the calculating an index of a stripe where the to-be-checked strip is located by considering additional elements of the parity block relative to the to-be-checked strip comprises:
calculating the index of the stripe where the to-be-checked strip is located according to the address of the to-be-checked strip, the sector length of each pack, a number of stripes in each pack, and a sector length occupied by the to-be-checked strip.

8. The method according to claim 7, wherein a formula for calculating the index of the stripe where the to-be-checked strip is located by considering additional elements of the parity block relative to the to-be-checked strip is: the index of the stripe where the to-be-checked strip is located=((the address of the to-be-checked strip/the sector length of each pack)*the number of stripes in each pack)+(the address of the to-be-checked strip % the sector length of each pack)/the sector length occupied by the to-be-checked strip,
wherein % is a modulus operation.

9. The method according to claim 8, wherein the address of the to-be-checked strip is the sector length from the to-be-checked strip to a starting position of the disk, the address of the to-be-checked strip % the sector length of each pack refers to an offset of a point to which the address is directed in a pack containing the point.

10. The method according to claim 1, the calculating the index of the stripe where the to-be-checked strip is located directly comprises: calculating the index of the stripe where the to-be-checked strip is located according to the address of the to-be-checked strip, the sector length of each pack, the number of stripes in each pack, the sector length occupied by each element in the to-be-checked strip, and the sector length occupied by the to-be-checked strip.

11. The method according to claim 10, wherein a formula for calculating the index of the stripe where the to-be-checked strip is located directly is: the index of the stripe where the to-be-checked strip is located=((the address of the to-be-checked strip/the sector length of each pack)*the number of stripes in each pack)+(the address of the to-be-checked strip % the sector length of each pack−the sector length occupied by each element in the to-be-checked strip)/the sector length occupied by the to-be-checked strip, wherein % is a modulus operation.

12. The method according to claim 11, wherein the address of the to-be-checked strip is the sector length from the to-be-checked strip to a starting position of the disk, the address of the to-be-checked strip % the sector length of each pack refers to an offset of a point to which the address is directed in a pack containing the point.

13. A terminal, comprising a memory and one or more processors, wherein computer-readable instructions are stored in the memory, and the computer-readable instructions, when executed by the processor, cause the one or more processors to perform the method according to claim 1.

14. The terminal according to claim 13, wherein the calculating a pack offset of a parity block according to a given disk index comprises:

calculating a position of the parity block in a pack containing the parity block according to the given disk index and a number of disks; and obtaining the pack offset of the parity block by calculating a product of the position of the parity block in the pack containing the parity block and a strip size.

15. The terminal according to claim 14, wherein the position of the parity block in the pack containing the parity block=[the number of disks−(the disk index+1)]/2.

16. The terminal according to claim 13, wherein the calculating an address of a strip where the parity block is located in the disk according to the pack offset comprises:

acquiring a pack index and a sector length of each pack; and obtaining the address of the strip where the parity block is located in the disk according to the pack index, the sector length of each pack, and the pack offset.

17. The terminal according to claim 16, wherein the address of the strip where the parity block is located in the disk=(the pack index*the sector length of each pack)+the pack offset.

18. The terminal according to claim 13, wherein the comparing an address of a to-be-checked strip with the address of the strip where the parity block is located in the disk to determine whether the parity block is on the to-be-checked strip comprises:

determining that the parity block is not on the to-be-checked strip in response to determining that the address of the to-be-checked strip is smaller than the address of the strip where the parity block is located in the disk; or determining that the parity block is on the to-be-checked strip in response to determining that the address of the to-be-checked strip is not smaller than the address of the strip where the parity block is located in the disk.

19. The terminal according to claim 13, wherein the calculating an index of a stripe where the to-be-checked strip is located by considering additional elements of the parity block relative to the to-be-checked strip comprises:

calculating the index of the stripe where the to-be-checked strip is located according to the address of the to-be-checked strip, the sector length of each pack, a number of stripes in each pack, and a sector length occupied by the to-be-checked strip.

20. A non transitory computer-readable storage medium storing computer-readable instructions, wherein the computer-readable instructions, when executed by one or more processors, cause the one or more processors to perform the method according to claim 1.

* * * * *